(12) United States Patent  
Kandagadla

(10) Patent No.: US 9,913,307 B2
(45) Date of Patent: Mar. 6, 2018

(54) TDLS SETUP CONTROL FROM ACCESS POINT

(71) Applicant: QUALCOMM Incorporated, San Diego, CA (US)

(72) Inventor: Manohar Kandagadla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/968,018

(22) Filed: Dec. 14, 2015

(65) Prior Publication Data

US 2017/0171895 A1   Jun. 15, 2017

(51) Int. Cl.
| | | |
|---|---|---|
| *H04W 76/02* | (2009.01) | |
| *H04W 24/08* | (2009.01) | |
| *H04W 24/10* | (2009.01) | |
| *H04W 76/04* | (2009.01) | |
| *H04W 36/02* | (2009.01) | |
| *H04W 84/12* | (2009.01) | |
| *H04W 36/22* | (2009.01) | |

(52) U.S. Cl.
CPC ......... *H04W 76/023* (2013.01); *H04W 24/08* (2013.01); *H04W 24/10* (2013.01); *H04W 36/02* (2013.01); *H04W 76/043* (2013.01); *H04W 36/22* (2013.01); *H04W 84/12* (2013.01)

(58) Field of Classification Search
CPC ... H04W 36/00; H04W 36/03; H04W 76/023; H04W 36/043; H04W 24/08; H04W 24/10; H04W 84/12
See application file for complete search history.

(56) References Cited

U.S. PATENT DOCUMENTS

| | | |
|---|---|---|
| 5,666,661 A | 9/1997 | Grube et al. |
| 8,391,266 B2 | 3/2013 | Seok |
| 8,885,538 B2 | 11/2014 | Seok |
| 8,958,299 B2 | 2/2015 | Seok |
| 2006/0148502 A1 | 7/2006 | Korneluk et al. |
| 2012/0230316 A1* | 9/2012 | Seok .................... H04W 76/023 370/338 |
| 2015/0245399 A1* | 8/2015 | Aoki ................... H04W 76/023 370/329 |

(Continued)

FOREIGN PATENT DOCUMENTS

| | | |
|---|---|---|
| EP | 2978259 A1 | 1/2016 |
| GB | 2390510 A | 1/2004 |
| WO | WO-2014146556 A1 | 9/2014 |

OTHER PUBLICATIONS

Wentink M., et al., "IEEE P802.11 Wireless LANs: Tunneled Direct Link Setup (TDLS)," Sep. 2007, 25 pages.

(Continued)

*Primary Examiner* — Benjamin H Elliott, IV
(74) *Attorney, Agent, or Firm* — Paradice and Li LLP

(57) ABSTRACT

A method and apparatus for establishing a direct link between wireless stations (STAs) in a wireless network, as performed by an access point (AP). The AP monitors communications routed through the AP between a first STA and a second STA in the wireless network, and determines a quality of the communications routed through the AP. The AP selectively establishes a direct link between the first STA and the second STA based at least in part on the quality of the communications routed through the AP.

27 Claims, 8 Drawing Sheets

(56) References Cited

U.S. PATENT DOCUMENTS

| | | | |
|---|---|---|---|
| 2016/0029429 A1* | 1/2016 | Peng .................... | H04W 36/00 370/329 |
| 2016/0037386 A1* | 2/2016 | Pitchaiah .............. | H04W 28/20 709/226 |
| 2016/0100355 A1* | 4/2016 | Chen .................... | H04W 8/005 370/232 |
| 2017/0171895 A1* | 6/2017 | Kandagadla ........ | H04W 76/023 |

OTHER PUBLICATIONS

"Wi-Fi Certified™ TDLS: Easy-to-Use, Security-Protected Direct Links to Improve Performance of Wi-Fi® Devices," Aug. 2012, 11 Pages.

International Search Report and Written Opinion—PCT/US2016/061416—ISA/EPO—dated Apr. 5, 2017.

* cited by examiner

TDLS SETUP CONTROL FROM ACCESS POINT

TECHNICAL FIELD

The example embodiments relate generally to wireless communications, and specifically to managing Tunneled Direct Link Setup communications by an access point in a wireless network.

BACKGROUND OF RELATED ART

A wireless local area network (WLAN) may include wireless devices such as an access point (AP) and one or more stations (STAs). Some WLANs may operate in an infrastructure mode such as one described by the IEEE 802.11 standard. In the infrastructure mode, network traffic may be transmitted directly between the STA and the AP. However, the infrastructure mode may use network resource inefficiently, particularly when the network traffic is directed between two STAs and does not involve the AP. In this case, the network traffic is transmitted twice: from a first STA to the AP and then from the AP to a second STA.

A Tunneled Direct Link Setup (TDLS) link enables the first STA to communicate directly with the second STA without going through the AP. This configuration helps reduce network congestion and may also reduce network traffic latency. To establish a TDLS link, the first STA may send a TDLS Discovery request message to the second STA. Although this message may be routed via the AP, the TDLS process is typically transparent to the AP (e.g., the AP is unaware that the first STA and second STA are attempting to establish a TDLS link). If the first STA does not receive a TDLS Discovery response from the second STA (e.g., within an allotted time), the first STA may (periodically) retransmit the TDLS Discovery request message to the second STA. This process may consume significant power by the first STA and/or second STA, and may contribute to traffic congestion in the wireless network.

Thus, there is a need to improve the establishment of TDLS links, especially under varying channel conditions.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for establishing a direct link between wireless stations (STAs) in a wireless network, as performed by an access point (AP), are disclosed. The AP monitors communications routed through the AP between a first STA and a second STA in the wireless network, and determines a quality of the communications routed through the AP. The AP selectively establishes a direct link between the first STA and the second STA based at least in part on the quality of the communications routed through the AP.

The quality of the communications may include an amount of data traffic between the first STA and the second STA. For example, the AP may establish the direct link when the amount of data traffic is greater than a threshold amount. Furthermore, the AP may determine a bandwidth consumption of the wireless network, and establish the direct link when the amount of data traffic between the first STA and the second STA accounts for at least a threshold percentage of the bandwidth consumption.

The quality of the communications may additionally and/or alternatively include signal strengths of each of the first and second STAs as measured by the AP. For example, the AP may establish the direct link when the signal strength of each of the first and second STAs is greater than a threshold level. Furthermore, the AP may establish the direct link when the signal strength of the first STA is substantially equal to the signal strength of the second STA.

Still further, the STA may determine an available bandwidth of the wireless network, and disable the direct link when the available bandwidth is greater than a threshold level. In some examples, the direct link may be a Tunneled Direct Link Setup (TDLS) link. For example, the AP may establish the direct link by instructing the first STA to initiate a TDLS Setup process (e.g., bypassing TDLS Discovery) with the second STA.

The methods of operation disclosed herein may allow an AP to manage and/or control the establishment (and teardown) of TDLS links between STAs in a wireless network. For example, because most, if not all, wireless communications in a wireless network are initially routed through the AP (e.g., including TDLS Discovery and Setup messages), the AP may have knowledge of the communications quality (e.g., transmit and receive statistics, signal strengths, etc.) for each client STA, as well as the overall quality of communications in the wireless network. Thus, the AP may be better-suited (e.g., than the individual STAs) to manage the establishment of TDLS links in the wireless network. The AP may ensure that a TDLS Setup process is attempted only when there is a high likelihood of success and/or doing so may benefit the wireless network. Accordingly, the methods of operation disclosed herein may reduce the power consumer of TDLS-enabled STAs, and may also reduce traffic congestion in the wireless network.

BRIEF DESCRIPTION OF THE DRAWINGS

The example embodiments are illustrated by way of example and are not intended to be limited by the figures of the accompanying drawings.

DETAILED DESCRIPTION

Figure 1:
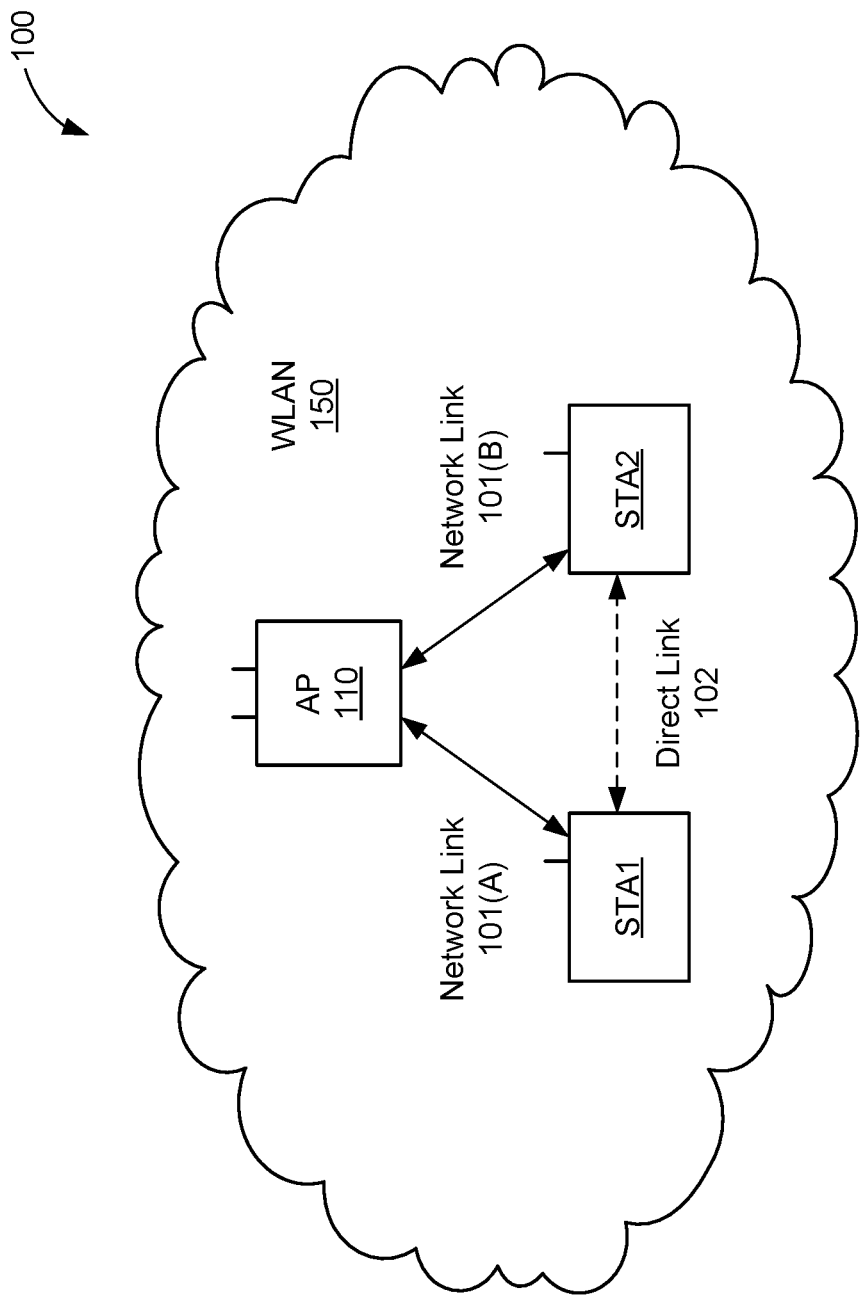
FIG. 1 shows a block diagram of a wireless system within which the example embodiments may be implemented.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, BLUETOOTH® (Bluetooth), HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots.

In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. The terms "direct link" or "direct connection" refer to a communications channel in which two wireless stations (STAs) may transmit data frames directly to one another (e.g., without going through the AP). The IEEE 802.11z amendment describes a Tunneled Direct Link Setup (TDLS) protocol that may be used to establish a direct link between two STAs in a wireless network. Accordingly, the terms "TDLS link," "direct link," and "direct connection" may be used interchangeably herein.

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

FIG. 1 is a block diagram of a wireless system 100 within which the example embodiments may be implemented. The wireless system 100 is shown to include a wireless access point (AP) 110 and wireless stations STA1 and STA2. The WLAN 150 may be formed by a plurality of Wi-Fi access points (APs) that may operate according to the IEEE 802.11 family of standards (or according to other suitable wireless protocols). Thus, although only one AP and two STAs are shown in FIG. 1 for simplicity, it is to be understood that WLAN 150 may be formed by any number of access points such as AP 110 and any number of STAs such as STA1 and/or STA2. Although the WLAN 150 is depicted in FIG. 1 as an infrastructure basic service set (BSS), for other example embodiments, WLAN 150 may be an independent basic service set (IBSS), an ad-hoc network, or a peer-to-peer (P2P) network (e.g., operating in accordance with the Wi-Fi Direct specification).

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. The AP 110 is assigned a unique media access control (MAC) address that is programmed therein by, for example, a device manufacturer. For some embodiments, the AP 110 may be any suitable wireless device (e.g., such as a wireless STA) acting as a software-enabled access point ("SoftAP"). For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5 and 6.

Each of the wireless stations STA1 and STA2 may be any suitable Wi-Fi enabled wireless device including, for example, a cell phone, personal digital assistant (PDA), tablet device, laptop computer, or the like. Each STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Each of the wireless stations STA1 and STA2 is also assigned a unique MAC address. For at least some embodiments, the wireless stations STA1 and STA2 may include one or more transceivers, one or more processing resources (e.g., processors and/or ASICs), one or more memory resources, and a power source (e.g., a battery).

For the AP 110 and/or the wireless stations STA1 and STA2, the one or more transceivers may include Wi-Fi transceivers, Bluetooth transceivers, NFC transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers may be any technically feasible transceiver such as a ZigBee transceiver described by the ZigBee specification, a WiGig transceiver, and/or a HomePlug transceiver described in a specification from the HomePlug Alliance The AP 110 may operate the WLAN 150 in an infrastructure mode. In the infrastructure mode, most (if not all) communications in the WLAN 150 are routed through the AP 110. For example, when STA1 attempts to transmit a data frame to STA2, STA1 must first transmit the data frame to the AP 110 (e.g., via a network link 101(A) between the AP 110 and STA1), and the AP 110 then forwards or retransmits the data frame to STA2 (e.g., via a network link 101(B) between the AP 110 and STA2). Similarly, when STA2 attempts to transmit a data frame to STA1, STA2 must first transmit the data frame to the AP 110 (e.g., via the network link 101(B)), and the AP 110 then forwards or retransmits the data frame to STA1 (e.g., via the network link 101(A)). Thus, each communication between STA1 and STA2 requires two transmissions within the WLAN 150.

In example embodiments, the AP 110 may monitor the data traffic in the WLAN 150 to determine whether it is appropriate to offload at least some of the data traffic onto a direct link. For example, by monitoring communications between STA1 and STA2, the AP 110 may detect that a majority of the data frames originating from STA1 are intended for STA2 and a majority of the data frames originating from STA2 are intended for STA1. Thus, STA1 and STA2 may be better served by communicating directly with each other (e.g., without having their communications routed through the AP 110). Accordingly, the AP 110 may instruct the wireless stations STA1 and STA2 to set up a direct link 102 between the devices. Once the direct link 102 is established, the wireless stations STA1 and STA2 may directly exchange data frames with one another (e.g., thus bypassing the AP 110).

In some instances, it may be desirable to maintain communications between the wireless stations STA1 and STA2 on the WLAN 150 (e.g., by routing the communication exchanges through the AP 110). For example, if very little data traffic (e.g., less than a threshold amount) is exchanged between STA1 and STA2, offloading the data traffic onto the direct link 102 may reduce the overall throughput of communications between the STAs. As described in greater detail below, establishing a direct link may require a number of steps (e.g., message exchanges) to be performed by both of the wireless stations STA1 and STA2. Thus, the cost (e.g., time and/or resources) associated with establishing the direct link 102 may outweigh the benefit of offloading communications onto the direct link 102 if there is relatively little data traffic between the wireless stations STA1 and STA2.

Furthermore, in some instances, the distance between STA1 and STA2 (e.g., for the direct link 102) may be substantially greater than the distance between the AP 110 and STA1 (e.g., for the network link 101(A)) and/or the distance between the AP 110 and STA2 (e.g., for the network link 101(B)). As a result, the signal strength of the direct link 102 may be substantially lower than the signal strengths of either of the network links 101(A) and/or 101(B). The throughput of the direct link 102 may therefore be less than the throughput of the WLAN 150, as data frames may need to be retransmitted more frequently on the direct link 102 (e.g., compared to network links 101(A) and 101(B)).

Still further, in some instances, offloading communications between the wireless stations STA1 and STA2 onto the direct link 102 may not be beneficial to the WLAN 150 and/or the AP 110. For example, if the overall activity in the WLAN 150 is relatively low (e.g., there is a substantial amount of available or unused bandwidth in the WLAN 150), there may be little or no benefit (e.g., from reduced overhead) to the WLAN 150 and/or AP 110 by offloading the data traffic between the wireless stations STA1 and STA2. Moreover, even while operating on the direct link 102, the wireless stations STA1 and STA2 may periodically switch back to their respective network links 101(A) and 101(B) to maintain connectivity with the WLAN 150 (e.g., by listening for beacon frames broadcast by the AP 110). Thus, it may be preferable and/or more efficient to maintain all communications between the wireless stations STA1 and STA2 on the WLAN 150 as long as available bandwidth of the WLAN 150 exceeds a threshold level.

The example embodiments recognize that, because most (if not all) devices in the WLAN 150 communicate with the AP 110, the AP 110 may be better-suited (e.g., than the individual STAs) to manage the establishment (and teardown) of direct links between individual STAs in the WLAN 150. For example, the AP 110 may have knowledge of the performance characteristics (e.g., transmit and receive statistics, signal strengths, etc.) for each of the wireless stations STA1 and STA2. The AP 110 may determine whether STA1 and STA2 should establish the direct link 102, for example, by weighing the communication quality of the direct link 102 with the bandwidth of the WLAN 150. In example embodiments, the AP 110 may selectively establish a direct link 102 between the wireless stations STA1 and STA2 based on the amount of data traffic exchanged between the wireless stations STA1 and STA2 and/or the respective signal strengths of the wireless stations STA1 and STA2, as measured by the AP 110.

The AP 110 may determine whether a particular STA in the WLAN 150 is capable of establishing a direct link with other STAs in the WLAN 150, for example, when the STA joins the WLAN 150. For example, during a wireless scanning operation, a STA may transmit a probe request to the AP 110 to discover the WLAN 150. The probe request may indicate a number of communication capabilities supported by the STA including, for example, whether the STA is capable of direct-link (e.g., TDLS) communications with other STAs. The AP 110 may respond by sending, to the requesting STA, a probe response that mirrors the information provided in the probe request intersected with the capabilities supported by the AP 110.

To ensure that the AP 110 has control over the establishment (and teardown) of direct links in the WLAN 150, individual STAs may be prevented from automatically establishing direct links with other STAs while operating on the WLAN 150. In example embodiments, the AP 110 may instruct each STA to refrain from automatically attempting to establish direct links with other STAs prior to (or upon) joining the WLAN 150. For example, the probe response sent from the AP 110 to a requesting STA may include a vendor-specific information element (VSIE) including instructions to refrain from initiating a direct-link setup operation with another STA, unless instructed to do so by the AP 110.

Figure 2:
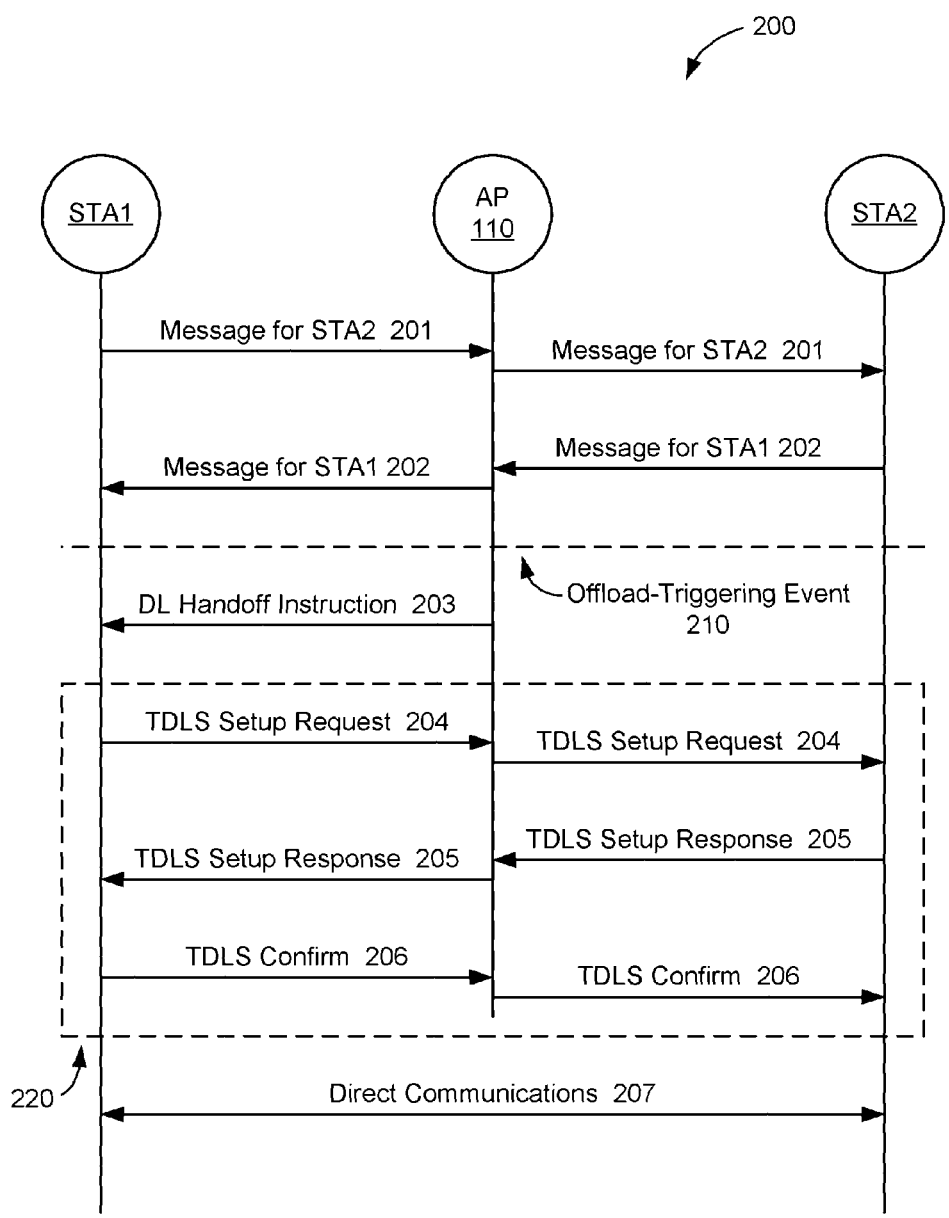
FIG. 2 shows an example sequence diagram depicting an establishment of a direct link, between two wireless stations (STAs), under the control of an access point (AP).

For example, with reference to the sequence diagram 200 of FIG. 2, the AP 110 may initially operate in an infrastructure mode. While operating in the infrastructure mode, the AP 110 may receive messages 201 from STA1 that are intended for STA2, and forward the messages 201 on to STA2. The AP 110 may further receive messages 202 from STA2 that are intended for STA1, and forward the messages 202 on to STA1. While operating in the infrastructure mode, the AP 110 may monitor the data traffic between the wireless stations STA1 and STA2 (e.g., and other data traffic in the WLAN 150). More specifically, the AP 110 may continuously monitor the data traffic between STA1 and STA2 until an offload-triggering event 210 occurs.

In example embodiments, the offload-triggering event 210 may occur when the volume of data traffic communicated between STA1 and STA2 (e.g., as detected by the AP 110) exceeds a threshold amount. For example, a high volume of data traffic being exchanged between STA1 and STA2 may indicate that the STAs are predominantly communicating with each other (e.g., rather than with the AP 110 and/or other devices in the WLAN 150). In this scenario, the wireless stations STA1 and STA2 may benefit (e.g., from reduced latency) by communicating directly with one another.

For some embodiments, the offload-triggering event 210 may occur if the amount of data traffic communicated between STA1 and STA2 (e.g., as detected by the AP 110) accounts for at least a threshold percentage of the total bandwidth consumption of the WLAN 150. For example, the bandwidth of the WLAN 150 may be inefficiently allocated if a large portion of the bandwidth is used exclusively for communications between STA1 and STA2. In this scenario, the WLAN 150 may benefit (e.g., from increased bandwidth and/or load balancing) by offloading the communications between STA1 and STA2 onto a direct link.

Still further, for some embodiments, the offload-triggering event 210 may occur only if the wireless stations STA1 and STA2 are within a threshold distance of one another (e.g., as determined by the AP 110). For example, as described above, the wireless stations STA1 and STA2 may derive little or no benefit from direct communications if the STAs are too far apart. More specifically, any improvements in latency (e.g., by having a direct link) may be offset by reductions in throughput (e.g., due to diminished channel quality). As described in greater detail below, the AP 110 may estimate the range and/or channel quality between the wireless stations STA1 and STA2 based on their respective signal strengths (e.g., as measured by the AP 110).

When an offload-triggering event 210 occurs, the AP 110 may send a direct-link (DL) handoff instruction 203 to STA1 (and/or STA2). The DL handoff instruction 203 may instruct STA1 to establish a direct link with STA2, and to subsequently communicate any data intended for STA2 over the direct link. Similarly, upon establishing the direct link with STA1, STA2 may subsequently communicate any data intended for STA1 over the direct link. In example embodiments, the DL handoff instruction 203 may be encapsulated in a new action frame transmitted over the WLAN 150 (e.g., network link 101(A)).

Upon receiving the DL handoff instruction 203, STA1 may perform a direct-link setup operation 220 with STA2. In example embodiments, the direct-link setup operation 220 may correspond with a TDLS Setup operation (e.g., as described by the IEEE 802.11z specification), in which a sequence of messages (e.g., data frames) are exchanged between the initiating STA and the responding STA to establish and verify a TDLS link. Although the examples described herein refer specifically to establishing a TDLS link, in other embodiments, the wireless stations STA1 and STA2 may implement other protocols and/or processes for establishing a direct link between the two devices.

As shown in FIG. 2, STA1 may first send a TDLS Setup request frame 204 to STA2. The TDLS Setup request frame 204 may indicate to STA2 that STA1 wishes to establish a TDLS link. More specifically, the TDLS Setup request frame 204 may include information about the capabilities of STA1. Because a direct link has yet to be established between STA1 and STA2, the TDLS Setup request frame 204 may be sent first to the AP 110 (e.g., from STA1). The AP 110 may then forward the TDLS Setup request frame 204 to STA2.

STA2 may respond to the TDLS Setup request frame 204 by sending a TDLS Setup response frame 205 to STA1. The TDLS Setup response frame 205 may indicate to STA1 that STA2 has successfully received the TDLS Setup request frame 204. More specifically, the TDLS Setup response frame 205 may include information about the capabilities of STA2 as well as a status code (e.g., accepting or rejecting the TDLS Setup request). As with the TDLS Setup request frame 204, the TDLS Setup response frame 205 may be sent first to the AP 110 and subsequently forwarded to STA1.

Finally, if the TDLS Setup request has been accepted by STA2 (e.g., as indicated by the TDLS Setup response frame 205), STA1 may respond to the TDLS Setup response frame 205 by sending a TDLS Confirm frame 206 to STA2. The TDLS Confirm frame 206 may confirm to STA2 that STA1 has received the TDLS Setup response frame 205. Since a direct link still has not been established yet, the TDLS Confirm frame 206 may be sent first to the AP 110 and subsequently forwarded to STA2. Once STA2 receives the TDLS Confirm frame 206, a TDLS link (e.g., direct link 102) is established between the wireless stations STA1 and STA2. At this point, the wireless stations STA1 and STA2 may communicate directly 207 with one another (e.g., without any involvement by the AP 110).

Either of the wireless stations STA1 and/or STA2 may tear down the direct link 102 at any time, for example, by sending a TDLS Teardown frame (not shown for simplicity) to the other STA. In example embodiments, the AP 110 may also trigger a teardown of the direct link 102 between STA1 and STA2. For example, the AP 110 may instruct STA1 (and/or STA2) to tear down the direct link 102 when the data traffic in the WLAN 150 drops below a threshold amount (e.g., there is a substantial amount of available network bandwidth to accommodate communications between STA1 and STA2).

In the example of FIG. 2, the direct-link setup operation 220 does not include a TDLS Discovery process. As described above, transmitting and retransmitting TDLS Discovery frames may consume significant power by STA1 and/or STA2, and may contribute to traffic congestion in the WLAN 150. However, as described above, the AP 110 may have knowledge of which STAs in the WLAN 150 support TDLS, as well as the performance characteristics of each STA. Thus, in example embodiments, the AP 110 may selectively trigger the direct-link setup operation 220 only if there is a relatively high probability that STA1 will successfully establish a direct link with STA2. Accordingly, the TDLS Discovery process may be bypassed when the AP 110 triggers the establishment of a direct link between two STAs in the WLAN 150.

In conventional TDLS implementations, the TDLS Discovery process is used by peer STAs to assess the channel quality of the direct link. For example, a particular STA may use the TDLS Discovery frame received from another STA to compare the relative signal strengths of the AP 110 and the other STA. This allows the STA to determine whether it would be more efficient to communicate with the other STA via a direct link or the WLAN 150 (e.g., through the AP 110). By eliminating the TDLS Discovery process, in example embodiments, the AP 110 may make this determination on behalf of the STAs based at least in part on the relative signal strengths of the STAs. Specifically, the AP 110 may determine whether a direct link would improve communications between two STAs based on the respective signal strengths of the STAs, as measured by the AP 110.

Figure 3:
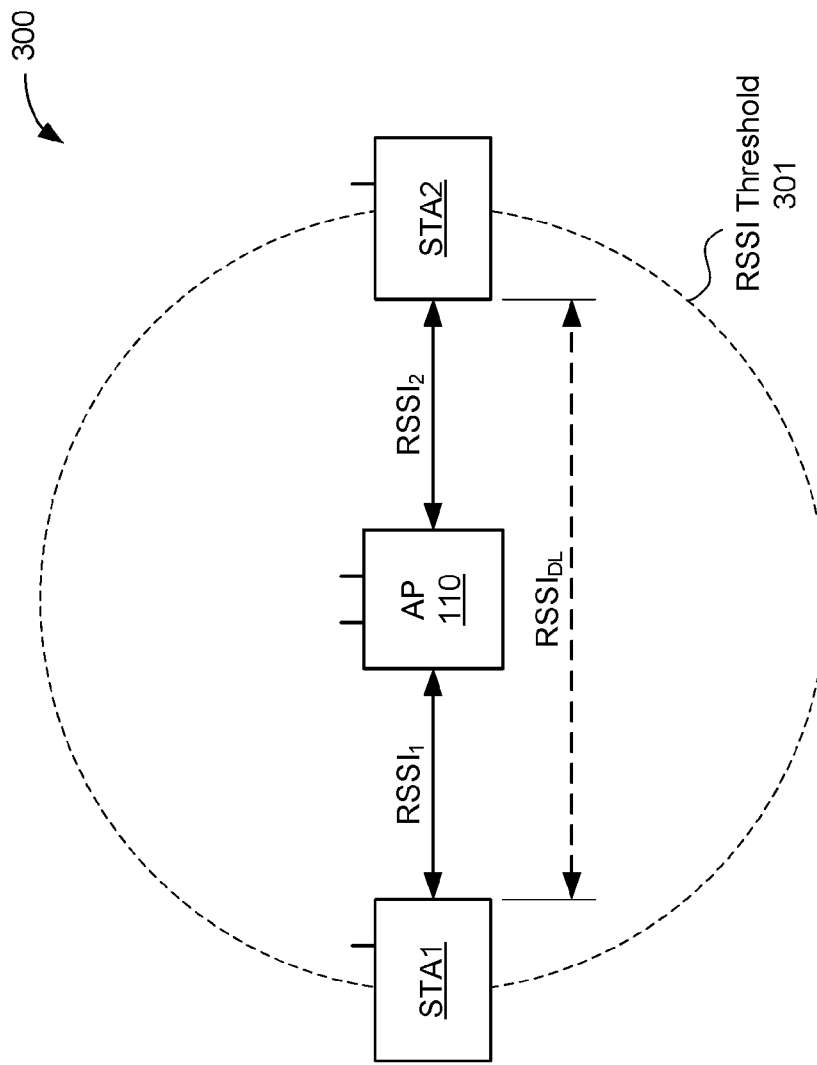
FIG. 3 shows a block diagram of an example wireless system in which a direct link may be established between STAs having respective signal strengths greater than a signal strength threshold, as measured by the AP.

FIG. 3 shows a block diagram of an example wireless system 300 in which a direct link may be established between STAs having respective signal strengths greater than a signal strength threshold, as measured by the AP. In the example of FIG. 3, the AP 110 may communicate with the wireless stations STA1 and STA2 in an infrastructure mode via a wireless network (not shown for simplicity). The AP 110 may measure the respective signals strengths of each of the wireless stations STA1 and STA2, for example, using well-known received signal strength indicator (RSSI) measurement techniques. More specifically, the AP 110 may determine a signal strength $RSSI_1$ of STA1 based on data frames received from STA1. Further, the AP 110 may determine a signal strength $RSSI_2$ of STA2 based on data frames received from STA2.

An RSSI threshold 301 (e.g., indicated by a dotted circle centered on the AP 110) represents a minimum guaranteed signal strength. More specifically, any two STAs with respective RSSI values (e.g., as measured by the AP 110) above the RSSI threshold 301 may have at least the minimum guaranteed signal strength when communicating directly with one another (e.g., upon establishing a direct link). For example, assuming each of $RSSI_1$ and $RSSI_2$ is greater than the RSSI threshold 301, the corresponding signal strength of the direct link between STA1 and STA2 (e.g., $RSSI_{DL}$) will have at least the minimum guaranteed signal strength.

In example embodiments, the minimum guaranteed signal strength may correspond to a minimum signal strength needed to make communicating over the direct link more efficient than communicating via the wireless network (e.g., through the AP 110). In other words, if $RSSI_{DL}$ is greater than (or equal to) the minimum guaranteed signal strength, the wireless stations STA1 and STA2 may benefit (e.g., from reduced latency) by communicating directly with one another (e.g., rather than routing their communications through the AP 110). On the other hand, if $RSSI_{DL}$ is less than the minimum guaranteed signal strength, the wireless stations STA1 and STA2 may benefit more (e.g., from increased throughput) by communicating through the AP 110.

Figure 4:
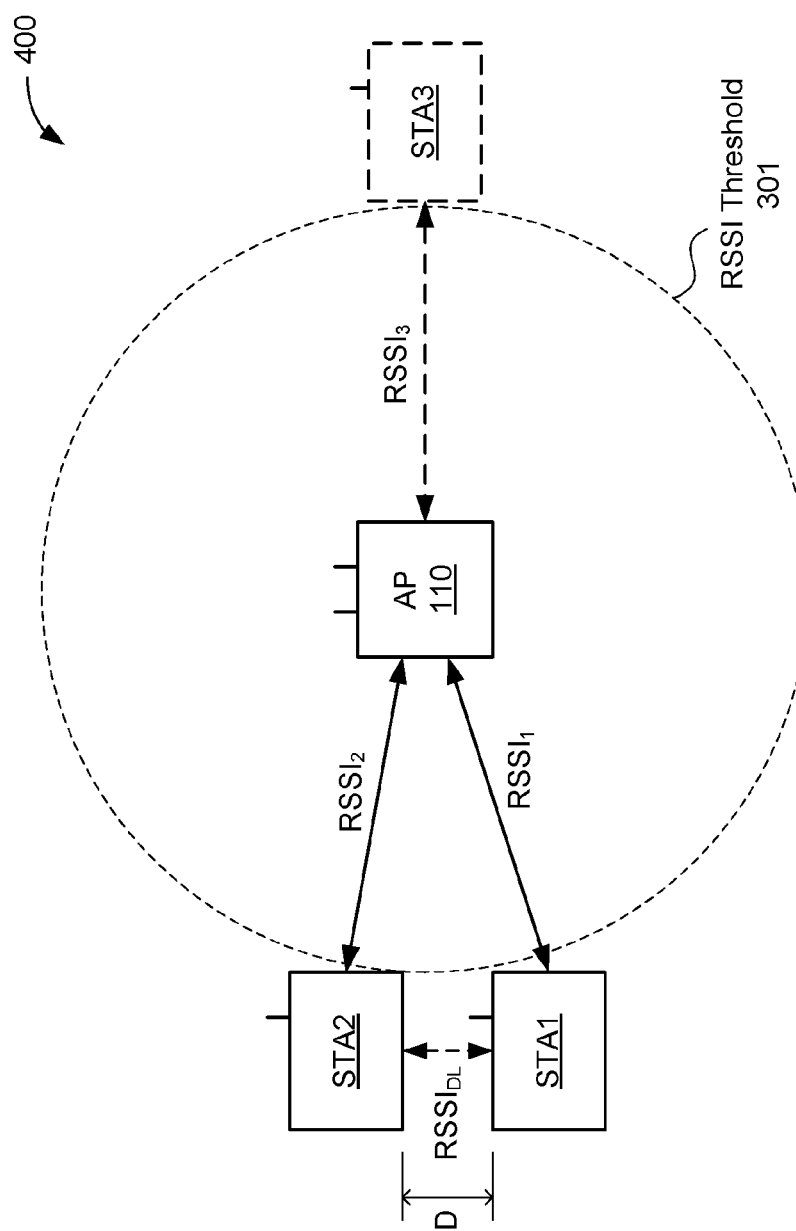
FIG. 4 shows a block diagram of an example wireless system in which a direct link may be established between STAs having substantially equal signal strengths, as measured by the AP.

In some instances, $RSSI_1$ and/or $RSSI_2$ may be below the RSSI threshold 301, yet $RSSI_{DL}$ may still be greater than the minimum guaranteed signal strength. For example, the wireless stations STA1 and STA2 may located far from the AP 110 but relatively close to each other (e.g., as shown in FIG. 4). In actual implementations, it may be difficult (if not impossible) for the AP 110 to directly measure the signal strength of the direct link 102 (e.g., $RSSI_{DL}$). However, in example embodiments, the AP 110 may use the respective signal strengths of the wireless stations STA1 and STA2 to determine a relative proximity of the STAs to one another. More specifically, the AP 110 may use the RSSI values for ranging purposes.

FIG. 4 shows a block diagram of an example wireless system 400 in which a direct link may be established between STAs having substantially equal signal strengths, as measured by the AP. The AP 110 may communicate with the wireless stations STA1 and STA2 in an infrastructure mode via a wireless network (not shown for simplicity). The AP 110 may measure the respective signal strengths of each of the wireless stations STA1 and STA2, for example, using well-known RSSI measurement techniques. More specifically, the AP 110 may determine a signal strength $RSSI_1$ of STA1 based on data frames received from STA1. Further, the AP 110 may determine a signal strength $RSSI_2$ of STA2 based on data frames received from STA2.

In the example of FIG. 4, both $RSSI_1$ and $RSSI_2$ are below the RSSI threshold 301. However, the signal strength of a direct link between STA1 and STA2 (e.g., $RSSI_{DL}$) may nonetheless be greater than a minimum guaranteed signal strength (e.g., due to the proximity of the STAs). In general, the closer two devices are to one another, the greater their perceived signal strengths may be.

In example embodiments, the AP 110 may compare the signal strengths $RSSI_1$ and $RSSI_2$ of the wireless stations STA1 and STA2, respectively, to determine a relative distance D between the STAs. For example, if $RSSI_1$ and $RSSI_2$ are substantially similar (e.g., $|RSSI_1-RSS_2|$<threshold variance), STA1 and STA2 are likely located in close proximity to one another. More specifically, the AP 110 may determine, based on the comparison of $RSSI_1$ and $RSSI_2$, whether STA1 and STA2 are located within a threshold distance needed to satisfy the minimum guaranteed signal strength to benefit from direct link communications (e.g., as described above with respect to FIG. 3).

Furthermore, the example embodiments recognize that the signal strength of a particular STA (e.g., as measured by the AP 110) depends on a number of factors including, but not limited to: distance from the AP 110, noise, obstructions, and/or other sources of interference along the signal path between the STA and the AP 110. Thus, it may be unlikely for two STAs located far part to have the same signal strengths. For example, as shown in FIG. 4, while wireless stations STA1 and STA2 may have substantially equal signal strengths $RSSI_1$ and $RSSI_2$, respectively, the signal strength $RSSI_3$ of a wireless station STA3 on the other side of the AP 110 may differ substantially from $RSSI_1$ and $RSSI_2$ (e.g., even though STA3 may be the same distance away from the AP 110 as STA1 and STA2).

Figure 5:
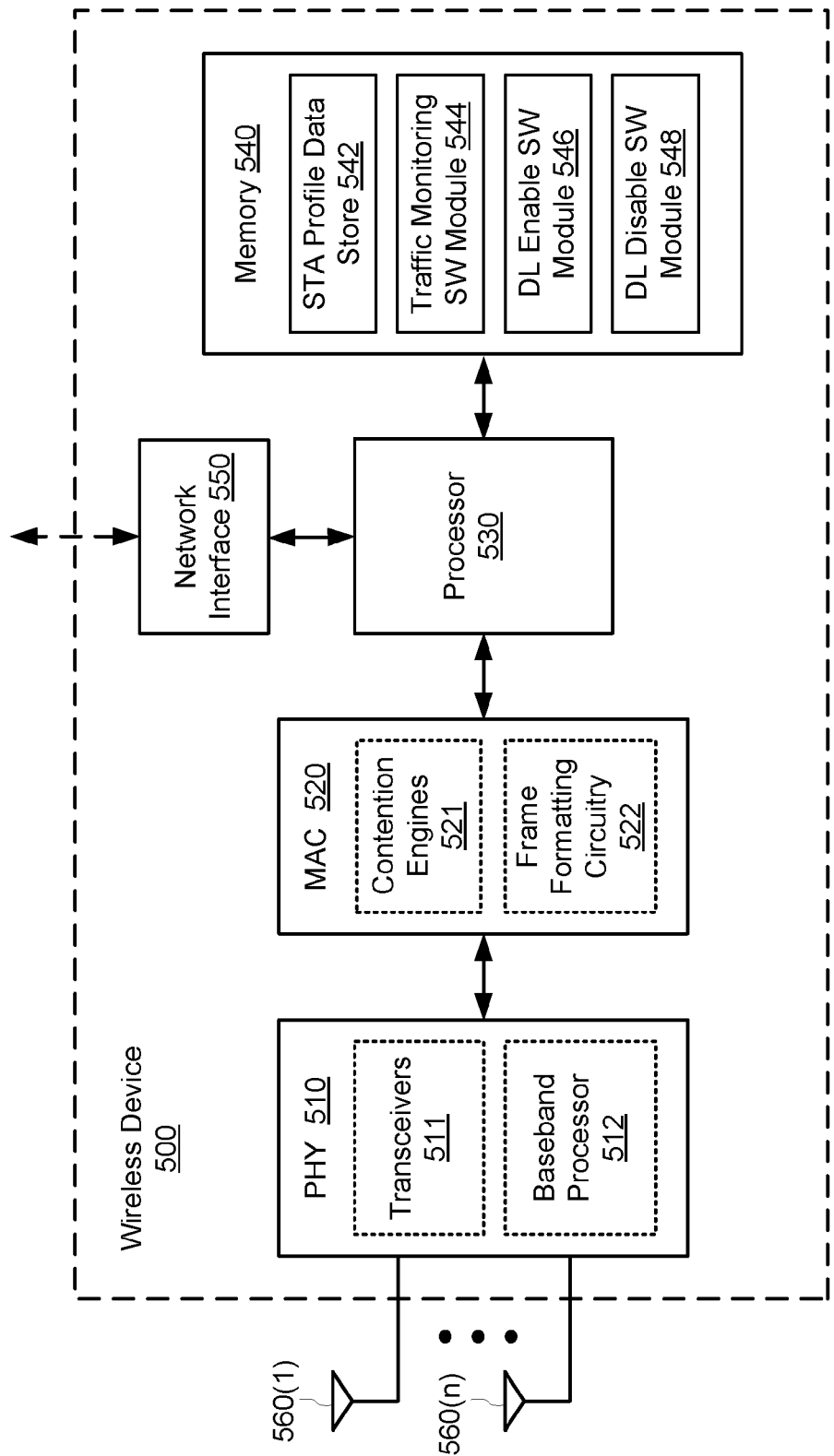
FIG. 5 shows a block diagram of a wireless device in accordance with example embodiments.

FIG. 5 shows a block diagram of a wireless device 500 in accordance with example embodiments. The wireless device 500 may be one embodiment of the AP 110 of FIG. 1. For some embodiments, the wireless device 500 may be a STA operating as a SoftAP or a group owner (GO) of a P2P network. The wireless device 500 includes at least a PHY device 510, a MAC 520, a processor 530, memory 540, a network interface 550, and a number of antennas 560(1)-560(n). For purposes of discussion herein, the MAC 520 is shown as being coupled between the PHY device 510 and processor 530. However, for actual embodiments, PHY device 510, MAC 520, processor 530, memory 540, and/or network interface 550 may be connected together using one or more buses (not shown for simplicity). The network interface 550 may be used to communicate with a WLAN server (not shown for simplicity) either directly or via one or more intervening networks, and to transmit signals.

The PHY device 510 includes at least a set of transceivers 511 and a baseband processor 512. The transceivers 511 may be coupled to antennas 560(1)-560(n), either directly or through an antenna selection circuit (not shown for simplicity). The transceivers 511 may be used to transmit signals to and receive signals from other wireless devices (e.g., APs, STAs, and/or peripheral devices), and may be used to scan the surrounding environment to detect and identify nearby wireless devices (e.g., within wireless range of the wireless device 500). The baseband processor 512 may be used to process signals received from processor 530 and/or memory 540 and to forward the processed signals to transceivers 511 for transmission via one or more antennas 560(1)-560(n). The baseband processor 512 may also be used to process signals received from one or more antennas 560(1)-560(n) via transceivers 511 and to forward the processed signals to the processor 530 and/or memory 540.

The MAC 520 includes at least a number of contention engines 521 and frame formatting circuitry 522. The contention engines 521 may contend for access to the shared wireless medium, and may also store packets for transmission over the shared wireless medium. For other embodiments, the contention engines 521 may be separate from the MAC 520. For still other embodiments, the contention engines 521 may be implemented as one or more software modules (e.g., stored in memory 540 or stored in memory provided within MAC 520) containing instructions that, when executed by processor 530, perform the functions of contention engines 521. The frame formatting circuitry 522 may be used to create and/or format frames received from processor 530 and/or memory 540 (e.g., by adding MAC headers to PDUs provided by processor 530). The frame formatting circuitry 522 may also be used to re-format frames received from PHY device 510 (e.g., by parsing VSIEs from management frames received from PHY device 510).

Memory 540 may include a STA profile data store 542 that stores profile information for one or more STAs The profile information for a particular STA may include information such as, for example, the STA's MAC address, supported data rates, connection history with the wireless device 500, direct link (e.g., TDLS) compatibility, and any other suitable information pertaining to or describing the operation of the STA.

Memory 540 may also include a non-transitory computer-readable medium (e.g., one or more nonvolatile memory elements, such as EPROM, EEPROM, Flash memory, a hard drive, etc.) that may store at least the following software (SW) modules:

a traffic monitoring SW module 544 to monitor data traffic in the wireless network (e.g., to and from the wireless device 500);

a direct link (DL) enable SW module 546 to selectively establish a direct link between two STAs in the wireless network based at least in part on the data traffic in the wireless network; and a direct link (DL) disable SW module 548 to selectively tear down a direct link between two STAs in the wireless network based at least in part on the data traffic in the wireless network.

Each software module includes instructions that, when executed by processor 530, causes the wireless device 500 to perform the corresponding functions. The non-transitory computer-readable medium of memory 540 thus includes instructions for performing all or a portion of the operations depicted in FIGS. 6 and 7.

Processor 530 may be any suitable one or more processors capable of executing scripts or instructions of one or more software programs stored in the wireless device 500 (e.g., within memory 540). For example, processor 530 may execute the DL enable SW module 546 to selectively establish a direct link between two STAs in the wireless network based at least in part on the data traffic in the wireless network. The processor 530 may also execute the DL disable SW module 548 to selectively tear down a direct link between two STAs in the wireless network based at least in part on the data traffic in the wireless network.

Figure 6:
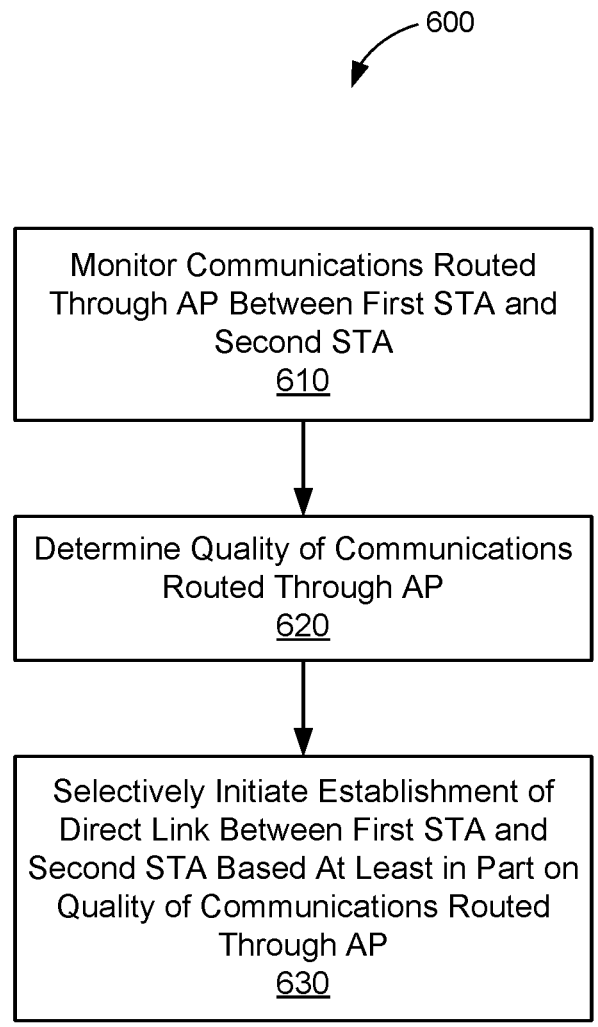
FIG. 6 shows a flowchart depicting an example operation for managing a direct link between STAs in a wireless network.

FIG. 6 shows a flowchart depicting an example operation 600 for managing a direct link between STAs in a wireless network. With reference, for example, to FIG. 1, the example operation 600 may be performed by the AP 110 to offload communications between the wireless stations STA1 and STA2 from the WLAN 150 to (e.g., network links 101(A) and 101(B)) to the direct link 102.

The AP 110 monitors communications routed through the AP 110 between the first STA and the second STA (610). For example, the AP 110 may operate the WLAN 150 in an infrastructure mode, wherein most (if not all) communications in the WLAN 150 are routed through the AP 110. In example embodiments, the AP 110 may monitor the data traffic between wireless stations STA1 and STA2 (e.g., on network links 101(A) and 101(B), respectively) to determine whether it is appropriate to offload at least some of the data traffic onto a direct link.

Further, the AP 110 determines a quality of the communications routed through the AP 110 (620). The quality of the communications may include at least a volume of data traffic exchanged between STA1 and STA2 and/or respective signal strengths of the STAs (e.g., as measured by the AP 110). For example, by monitoring communications between STA1 and STA2, the AP 110 may detect whether a majority of the data frames originating from STA1 are intended for STA2 and majority of the data frames originating from STA2 are intended for STA1. Furthermore, by measuring the respective signal strengths of the wireless stations STA1 and STA2, the AP 110 may estimate the signal strength of STA1 as perceived by STA2 and/or the signal strength of STA2 as perceived by STA1 (e.g., as described above with respect to FIG. 3). Additionally, or alternatively, the AP 110 may estimate a proximity of STA1 relative to STA2 based on their respective signal strengths (e.g., as described above with respect to FIG. 4).

The AP 110 may selectively initiate establishment of a direct link between the first STA and the second STA based at least in part on the quality of communications routed through the AP 110 (630). For example, as described above with respect to FIG. 2, the AP 110 may initiate the establishment of the direct link 102 between STA1 and STA2 when an offload-triggering event 210 occurs. For some embodiments, the offload-triggering event 210 may be based at least in part on the volume of data traffic exchanged between the wireless stations STA1 and STA2 (e.g., as detected by the AP 110). For other embodiments, the offload-triggering event 210 may be based at least in part on the respective signal strengths of the wireless stations STA1 and STA2 (e.g., as measured by the AP 110).

Figure 7:
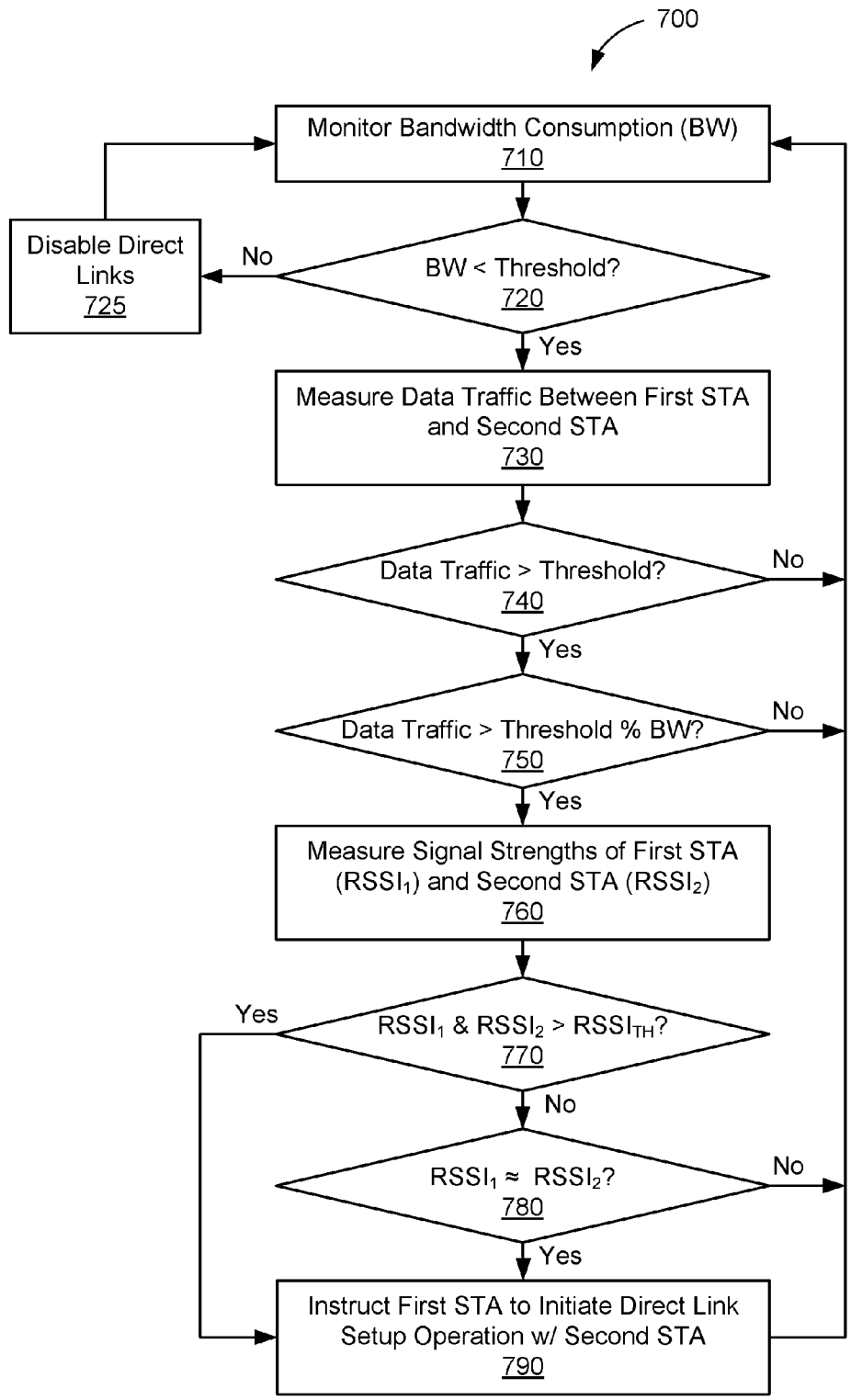
FIG. 7 shows a flowchart depicting an example operation for determining when to establish and/or tear down a direct link between STAs in a wireless network.

FIG. 7 shows a flowchart depicting an example operation 700 for determining when to establish and/or tear down a direct link between STAs in a wireless network. With reference, for example, to FIG. 1, the example operation 700 may be performed by the AP 110 to establish and/or tear down the direct link 102 between the wireless stations STA1 and STA2.

The AP 110 may continuously monitor a bandwidth consumption of the wireless network (710) and compare the amount of bandwidth consumed with a bandwidth threshold (720). For example, if the overall activity in the WLAN 150 is relatively low (e.g., there is a substantial amount of available or unused bandwidth in the WLAN 150), there may be little or no benefit to offloading any of the data traffic in the WLAN 150 (e.g., onto a direct link).

Thus, as long as the network bandwidth is below the bandwidth threshold (as tested at 720), the AP 110 may disable the use and/or establishment of direct links between STAs operating in the wireless network (725). For example, the STAs may be prevented from transmitting TDLS Discovery requests, TDLS Setup requests, /or otherwise attempting to establish a direct link with another STA while operating on the WLAN 150 (e.g., until instructed to do so by the AP 110).

If the bandwidth consumption exceeds or is equal to the bandwidth threshold (as tested at 720), the AP 110 may measure the amount of data traffic between the first STA and the second STA (730). In particular, the AP 110 may measure the amount of data traffic originating from STA1 and intended specifically for STA2, as well as the amount of data traffic originating from STA2 and intended specifically for STA1.

The AP 110 may then determine whether the volume of data traffic exchanged between the first STA and the second STA exceeds a threshold amount (740). For example, if a high volume of data traffic originating from STA1 is intended for STA2, and/or a high volume of data traffic originating from STA2 is intended for STA1, communications between the wireless stations STA1 and STA2 may benefit from reduced latency if a direct link is established between the STAs.

If the volume of data traffic exchanged between the STAs does not exceed the threshold amount (as tested at 740), the AP 110 may continue to monitor the bandwidth consumption of the network (710) without establishing a direct link between the STAs. For example, in some instances, the cost (e.g., time and/or resources) associated with establishing a direct link may outweigh the benefit of offloading communications onto the direct link. Thus, if very little data traffic (e.g., less than the threshold amount) is exchanged between STA1 and STA2, offloading the data traffic onto a direct link may actually reduce the overall throughput of communications between the STAs.

If the volume of data traffic meets or exceeds the threshold amount (as tested at 740), the AP 110 may then determine whether the data traffic between STA1 and STA2 accounts for at least a threshold percentage of the bandwidth consumption of the wireless network (750). For example, if a large percentage of the network bandwidth is being used specifically for communications between STA1 and STA2, the WLAN 150 and/or AP 110 may benefit from reduced overhead if the communications between STA1 and STA2 are offloaded from the WLAN 150 onto a direct link.

If the volume of data traffic exchanged between the STAs does not account for at least the threshold percentage of bandwidth consumption (as tested at 750), the AP 110 may continue to monitor the bandwidth consumption of the network (710) without establishing a direct link between the STAs. For example, if a majority of the network bandwidth is being used for other communications and/or processes (e.g., other than communications between STA1 and STA2), there may be little or no benefit to the WLAN 150 and/or AP 110 by offloading the data traffic between the wireless stations STA1 and STA2 onto a direct link.

If the volume of data traffic exchanged between the STAs accounts for at least the threshold percentage of bandwidth consumption (as tested at 750), the AP 110 may measure the respective signal strengths of the first STA and the second STA (760). For example, the AP 110 may measure the signal strength of each of the wireless station STA1 and STA2 using well-known RSSI measurement techniques. The AP 110 may then compare the respective signal strengths for each of the STAs with an RSSI threshold (770) to estimate the perceived signal strength of each STA as measured by the other STA. For example, the RSSI threshold may represent a minimum guaranteed signal strength for which communicating over the direct link may be more efficient than communicating via the wireless network (e.g., through AP 110).

If the respective signal strengths of both STAs are greater than the RSSI threshold (as tested at 770), the AP 110 may instruct the first STA to initiate a direct link setup operation with the second STA (790). For example, as described above with respect to FIG. 3, any two STAs with respective RSSI values (e.g., as measured by the AP 110) above the RSSI threshold 301 will have at least the minimum guaranteed signal strength when communicating directly with one another (e.g., upon establishing a direct link). Accordingly, the wireless stations STA1 and STA2 may benefit from reduced latency and/or throughput by offloading their communications onto the direct link 102 when their respective signal strengths exceed the RSSI threshold. In example embodiments, as described above with respect to FIG. 2, the AP 110 may To establish the direct link, in example embodiments, STA1 may initiate the direct link setup operation 220 with STA2 (e.g., in response to receiving a DL handoff instruction 203 from the AP 110) by transmitting a TDLS Setup request frame 204 to STA2.

If the signal strength of at least one of the STAs does not exceed the RSSI threshold (as tested at 770), the AP 110 may compare the relative signal strengths of both STAs (780) to estimate a relative proximity of the STAs. For example, as described above with respect to FIG. 4, two STAs with substantially similar signal strengths are likely to be located relatively close to one another. More specifically, by comparing the relative signal strengths of STA1 and STA2, the AP 110 may determine whether the STAs are located within a threshold distance needed to satisfy the minimum guaranteed signal strength to benefit from direct link communications (e.g., as described above with respect to FIG. 3). Thus, if the signal strengths of both STAs are substantially similar (as tested at 780), the AP 110 may instruct the first STA to initiate a direct link setup operation with the second STA (790).

However, if the signal strength of at least one of the STAs does not exceed the RSSI threshold (as tested at 770) and the signal strengths of both STAs are not substantially similar (as tested at 780), may continue to monitor the bandwidth consumption of the network (710) without establishing a direct link between the STAs. In this scenario, it is likely that the signal strength of STA1 as perceived by STA2, and/or the signal strength of STA2 as perceived by STA1, does not meet the minimum guaranteed signal strength requirement. Thus, the wireless stations STA1 and STA2 may not benefit from communicating directly with one another. For example, if the wireless stations STA1 and STA2 were to establish the direct link 102, any benefit from reduced latency (e.g., for not having to route communications through the AP 110) may be offset by an overall decrease in throughput (e.g., by having to retransmit data frames due to the low channel quality of the direct link).

Figure 8:
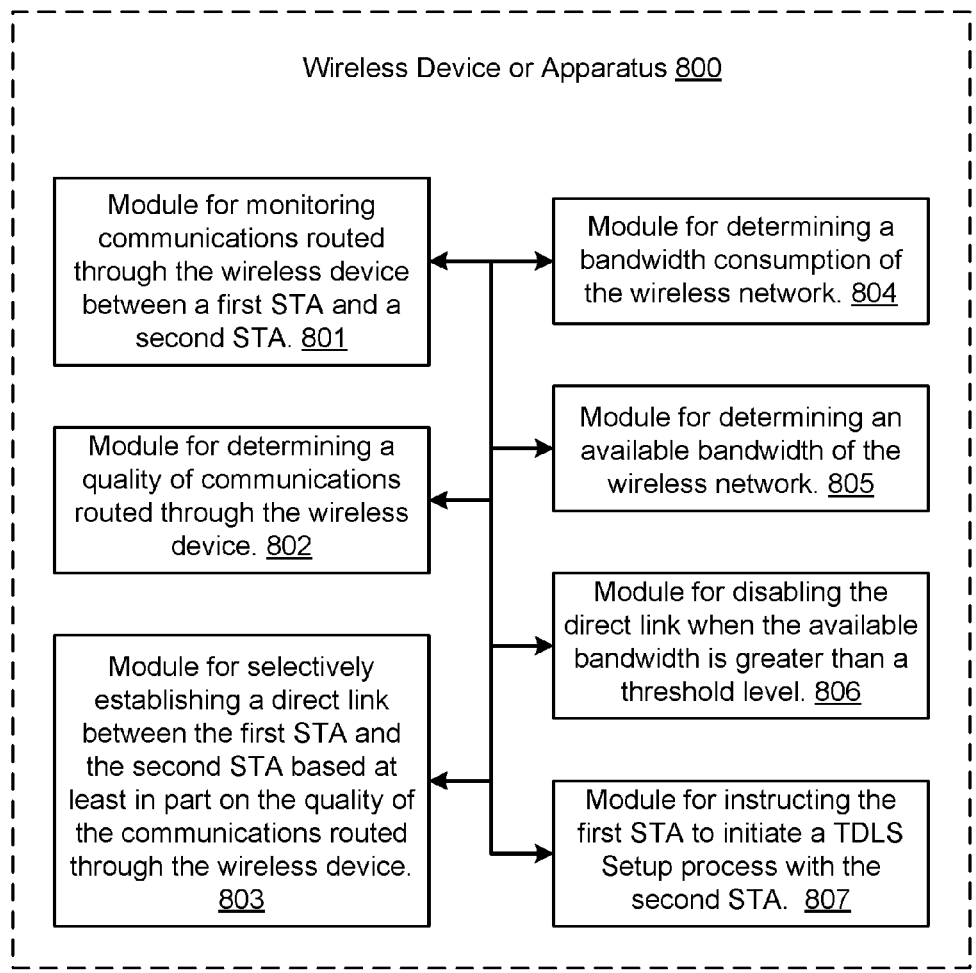
FIG. 8 shows an example wireless device represented as a series of interrelated functional modules.

FIG. 8 shows an example wireless device 800 represented as a series of interrelated functional modules. A module 801 for monitoring communications routed through the wireless device between a first STA and a second STA may correspond at least in some aspects to, for example, a processor as discussed herein (e.g., processor 530). A module 802 for determining a quality of the communications routed through the wireless device may correspond at least in some aspects to, for example, a processor as discussed herein (e.g., processor 530). A module 803 for selectively establishing a direct link between the first STA and the second STA based at least in part on the quality of the communications routed through the wireless device may correspond at least in some aspects to, for example, a processor as discussed herein (e.g., processor 530).

A module 804 for determining a bandwidth consumption of the wireless network may correspond at least in some aspects to, for example, a processor as discussed herein (e.g., processor 530). A module 805 for determining an available bandwidth of the wireless network may correspond at least in some aspects to, for example, a processor as discussed herein (e.g., processor 530). A module 806 for disabling the direct link when the available bandwidth is greater than a threshold level may correspond in some aspects to, for example, a processor as discussed herein (e.g., processor 530). A module 807 for instructing the first STA to initiate a TDLS Setup process with the second STA may correspond at least in some aspects to, for example, a processor as discussed herein (e.g., processor 530).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for establishing a direct link between wireless stations (STAs) in a wireless network, the method being performed by an access point (AP) in the wireless network and comprising:
   monitoring communications routed through the AP between a first STA and a second STA in the wireless network;
   determining a quality of the communications routed through the AP;
   selectively initiating establishment of a direct link between the first STA and the second STA based at least in part on the quality of the communications routed through the AP;
   determining whether an amount of unused bandwidth in the wireless network exceeds a threshold level; and
   disabling the direct link upon determining that the amount of unused bandwidth exceeds the threshold level.

2. The method of claim 1, wherein the quality of the communications includes an amount of data traffic between the first STA and the second STA.

3. The method of claim 2, wherein the selectively initiating comprises:
   initiating the establishment of the direct link when the amount of data traffic is greater than a threshold amount.

4. The method of claim 2, wherein the selectively initiating comprises:
   determining a bandwidth consumption of the wireless network; and
   initiating the establishment of the direct link when the amount of data traffic between the first STA and the second STA accounts for at least a threshold percentage of the bandwidth consumption.

5. The method of claim 1, wherein the quality of the communications includes signal strengths of each of the first and second STAs as measured by the AP.

6. The method of claim 5, wherein the selectively initiating comprises:
   initiating the establishment of the direct link when the signal strength of each of the first and second STAs is greater than a threshold level.

7. The method of claim 5, wherein the selectively initiating comprises:
   initiating the establishment of the direct link when the signal strength of the first STA is substantially equal to the signal strength of the second STA.

8. The method of claim 1, wherein the direct link is a Tunneled Direct Link Setup (TDLS) link.

9. The method of claim 8, wherein the selectively initiating comprises:
   instructing the first STA to initiate a TDLS Setup process with the second STA.

10. A wireless device, comprising:
    one or more processors; and
    a memory storing instructions that, when executed by the one or more processors, cause the wireless device to:
    monitor communications routed through the wireless device between a first wireless station (STA) and a second STA in a wireless network;
    determine a quality of the communications routed through the wireless device;
    selectively initiate establishment of a direct link between the first STA and the second STA based at least in part on the quality of the communications routed through the wireless device;
    determine whether an amount of unused bandwidth in the wireless network exceeds a threshold level; and
    disable the direct link upon determining that the amount of unused bandwidth exceeds the threshold level.

11. The wireless device of claim 10, wherein the quality of the communications includes an amount of data traffic between the first STA and the second STA.

12. The wireless device of claim 11, wherein execution of the instructions for selectively initiating establishment of the direct link causes the wireless device to:
    initiate the establishment of the direct link when the amount of data traffic is greater than a threshold amount.

13. The wireless device of claim 11, wherein execution of the instructions for selectively initiate establishment of the direct link causes the wireless device to:
  determine a bandwidth consumption of the wireless network; and
  initiate the establishment of the direct link when the amount of data traffic between the first STA and the second STA accounts for at least a threshold percentage of the bandwidth consumption.

14. The wireless device of claim 10, wherein the quality of the communications includes signal strengths of each of the first and second STAs as measured by the wireless device.

15. The wireless device of claim 14, wherein execution of the instructions for selectively initiating establishment of the direct link causes the wireless device to:
  initiate the establishment of the direct link when the signal strength of each of the first and second STAs is greater than a threshold level.

16. The wireless device of claim 14, wherein execution of the instructions for selectively initiating establishment of the direct link causes the wireless device to:
  initiate the establishment of the direct link when the signal strength of the first STA is substantially equal to the signal strength of the second STA.

17. The wireless device of claim 10, wherein the direct link is a Tunneled Direct Link Setup (TDLS) link, and wherein execution of the instructions for selectively initiating establishment of the direct link causes the wireless device to:
  instruct the first STA to initiate a TDLS Setup process with the second STA.

18. A wireless device, comprising:
  means for monitoring communications routed through the wireless device between a first wireless station (STA) and a second STA in a wireless network;
  means for determining a quality of the communications routed through the wireless device;
  means for selectively initiating establishment of a direct link between the first STA and the second STA based at least in part on the quality of the communications routed through the wireless device;
  means for determining whether an amount of unused bandwidth in the wireless network exceeds a threshold level; and
  means for disabling the direct link upon determining that the amount of unused bandwidth exceeds the threshold level.

19. The wireless device of claim 18, wherein the quality of the communications includes an amount of data traffic between the first STA and the second STA, and wherein the means for selectively initiating establishment of the direct link is to:
  initiate the establishment of the direct link when the amount of data traffic is greater than a threshold amount.

20. The wireless device of claim 18, wherein the quality of the communications includes an amount of data traffic between the first STA and the second STA, and wherein the means for selectively initiating establishment of the direct link is to:
  determine a bandwidth consumption of the wireless network; and
  initiate the establishment of the direct link when the amount of data traffic between the first STA and the second STA accounts for at least a threshold percentage of the bandwidth consumption.

21. The wireless device of claim 18, wherein the quality of the communications includes signal strengths of each of the first and second STAs as measured by the wireless device, and wherein the means for selectively initiating establishment of the direct link is to:
  initiate the establishment of the direct link when the signal strength of each of the first and second STAs is greater than a threshold level.

22. The wireless device of claim 18, wherein the quality of the communications includes signal strengths of each of the first and second STAs as measured by the wireless device, and wherein the means for selectively initiating establishment of the direct link is to:
  initiate the establishment of the direct link when the signal strength of the first STA is substantially equal to the signal strength of the second STA.

23. A non-transitory computer-readable storage medium storing instructions that, when executed by one or more processors of a wireless device, cause the wireless device to establish a direct link between wireless stations (STAs) in a wireless network by performing operations comprising:
  monitoring communications routed through the wireless device between a first STA and a second STA in a wireless network;
  determining a quality of the communications routed through the wireless device;
  selectively initiating establishment of a direct link between the first STA and the second STA based at least in part on the quality of the communications routed through the wireless device;
  determining whether an amount of unused bandwidth in the wireless network exceeds a threshold level; and
  disabling the direct link upon determining that the amount of unused bandwidth exceeds the threshold level.

24. The non-transitory computer-readable storage medium of claim 23, wherein the quality of the communications includes an amount of data traffic between the first STA and the second STA, and wherein execution of the instructions for selectively initiating establishment of the direct link causes the wireless device to:
  initiate the establishment of the direct link when the amount of data traffic is greater than a threshold amount.

25. The non-transitory computer-readable storage medium of claim 23, wherein the quality of the communications includes an amount of data traffic between the first STA and the second STA, and wherein execution of the instructions for selectively initiating establishment of the direct link causes the wireless device to:
  determine a bandwidth consumption of the wireless network; and
  initiate the establishment of the direct link when the amount of data traffic between the first STA and the second STA accounts for at least a threshold percentage of the bandwidth consumption.

26. The non-transitory computer-readable storage medium of claim 23, wherein the quality of the communications includes signal strengths of each of the first and second STAs as measured by the wireless device, and wherein execution of the instructions for selectively initiating establishment of the direct link causes the wireless device to:
  initiate the establishment of the direct link when the signal strength of each of the first and second STAs is greater than a threshold level.

27. The non-transitory computer-readable storage medium of claim 23, wherein the quality of the communications includes signal strengths of each of the first and second STAs as measured by the wireless device, and wherein execution of the instructions for selectively initiating establishment of the direct link causes the wireless device to:
   initiate the establishment of the direct link when the signal strength of the first STA is substantially equal to the signal strength of the second STA.

* * * * *